Aug. 14, 1956     E. JAHNEL     2,758,485
DRIVING ARRANGEMENT
Filed July 6, 1955
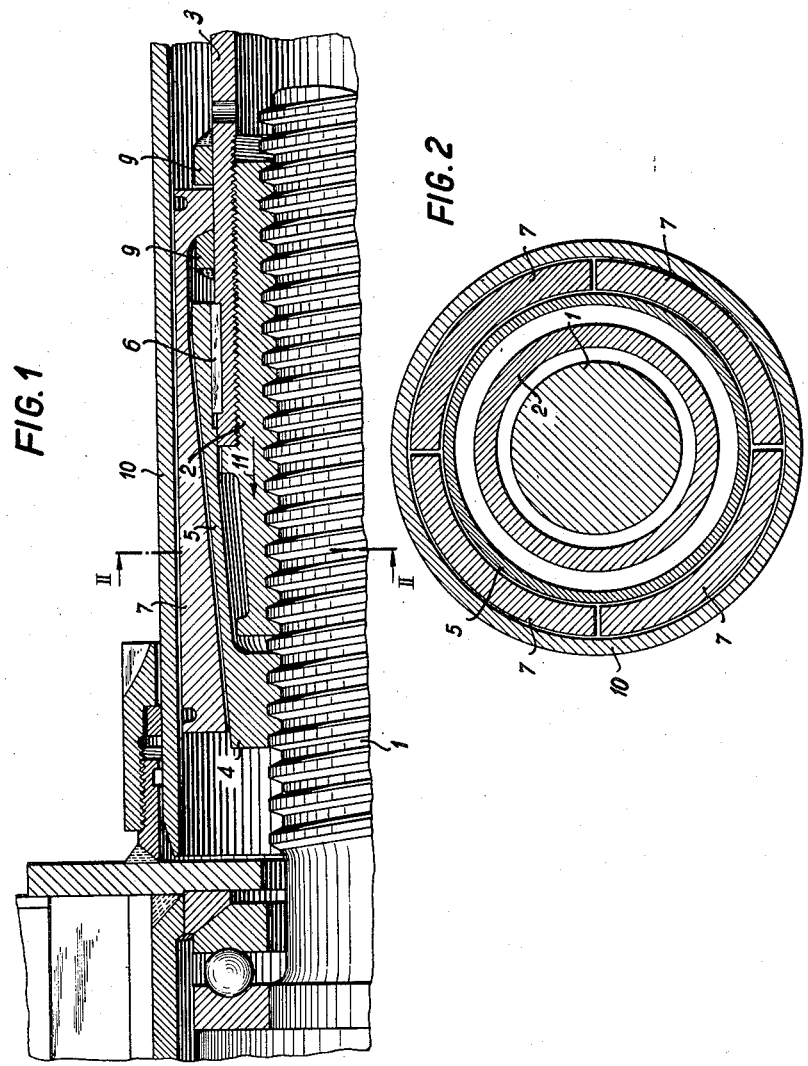
INVENTOR
Ernst Jahnel
by:
Michael S. Striker
         agt.

United States Patent Office 2,758,485
Patented Aug. 14, 1956

2,758,485

DRIVING ARRANGEMENT

Ernst Jahnel, Munich, Germany, assignor to Anton Schroder, Munich, Germany

Application July 6, 1955, Serial No. 520,327

Claims priority, application Germany July 6, 1954

12 Claims. (Cl. 74—424.8)

The present invention relates to a driving arrangement.

More particularly, the present invention relates to a driving arrangement which is particularly adapted to be used in conjunction with or as a jack for lifting platforms or the like. Such lifting arrangements should, for the sake of safety, be provided with a suitable braking or retarding mechanism for preventing falling of the platform or other load in the event of damage to one or more of the constituent parts of the device.

It is therefore one of the objects of the present invention to provide a driving arrangement for use in a jack or the like which driving arrangement is provided with a braking mechanism for preventing falling of a platform or other load in the event of rupture of one or more of the structural elements of the jack.

It is another object of the present invention to provide a driving arrangement which is provided with a braking mechanism for preventing relative movement between a drive member and a driven member at an excessive rate.

The objects of the present invention also include the provision of a driving arrangement and braking mechanism therefore which is sturdy, which comprises a minimum number of parts and which may, therefore, be constructed extremely economically.

With the above objects in view, the present invention mainly consists in a driving arrangement which comprises a spindle drive member having an external thread portion, a tubular driven member encompassing the drive member and having an internal thread portion in threaded engagement with the external thread portion of the drive member so that the same may drive the driven member in opposite axial directions, and abutment or wedge means for preventing axial movement of the driven member in at least one of the directions at a rate greater than the rate at which the drive member drives the driven member.

The wedge means includes a first movable wedge member, at least one and preferably a plurality of second movable wedge members, and a third preferably stationary tubular wedge member. The first movable wedge member is independent of the internal thread portion of the driven member, is in threaded engagement with the external thread portion of the drive member so that the same may drive the first movable wedge member in opposite axial directions at the same rate at which the drive member drives the driven member, and has a substantially frusto-conical outerwedge surface diverging in the one direction. The third tubular wedge member encompasses the drive and driven members, extends axially throughout the length along which the drive member drives the driven member, and has a substantially cylindrical inner wedge surface. The second movable wedge members are mounted on the driven member, and each of these movable wedge members has an inner wedge surface constituting a portion of a substantially frusto-conical inner wedge surface diverging in the one direction and adapted to cooperate with the outer wedge surface of the first movable wedge member. Each movable wedge member also has an outer wedge surface constituting a portion of a substantially cylindrical outer wedge surface adapted to cooperate with the inner wedge surface of the third wedge member. The cooperating wedge surfaces are normally out of wedging engagement with each other but are adapted wedgingly to engage each other when the driven member tends to move in the one direction at such greater rate, whereby in the event of such rupture of the internal thread portion of the driven member as will permit independent axial movement thereof in the one direction relative to the drive member at such greater rate, the second movable wedge members will be wedged between the first and third wedge members, thereby preventing axial movement in the one direction of the driven member relative to the drive member at such greater rate.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a fragmentary sectional view of a preferred embodiment according to the present invention; and Fig. 2 is a sectional view taken along line 2—2 of Fig. 1.

Referring now to the drawing, there is shown a drive arrangement incorporating the present invention. The drive includes a threaded spindle drive member 1 which may be rotated about its axis but axial movement of which is prevented. A tubular driven member 3 which is adapted to be connected to a lifting mechanism for raising a platform or other load encompasses the spindle 1, and a connecting nut 2 is interposed between the spindle 1 and the tubular member 3 in such a manner that the nut 2 is in threaded engagement with the spindle 1 and is movable axially with the tubular member 3. Also, the connection between the nut 2 and the tubular member 3 is such that these elements are non-rotatably connected to each other so that when rotation of the tubular member 3 is prevented, as, for example, by virtue of its being connected to a lifting mechanism or the like, rotation of the spindle 1 will cause axial displacement of the tubular member 3. If desired, the nut 2 may be integral with the tubular member 3.

The connection of the tubular member 3 is such that the platform or other load with which the lifting mechanism is associated is raised when the tubular member 3 is moved in the direction of the arrow 11, so that the weight of the load will constantly tend to move tubular member 3 in a direction opposite to the direction indicated by the arrow. A suitable braking or retarding arrangement is provided for preventing such movement of the tubular member 3 in the event of rupture or other damage of the nut 2.

The braking mechanism according to the present invention comprises a wedge or abutment means which includes a first wedge or abutment member 4 which encompasses the spindle 1 and is in threaded engagement therewith. The member 4 is independent of the nut 2 but will be moved in axial direction at the same rate at which the spindle 1 moves the nut inasmuch as rotation of the number 4 is prevented in any suitable manner. In the illustrated embodiment rotation of the member 4 is prevented by providing key means 6 which prevents rotation of the member 4 relative to the tubular member 3 and consequently relative to the spindle 1, the arrangement of the key means, however, being such that independent axial movement between the tubular member 3 and the member 4 is not prevented.

The member 4 is formed with a substantially frusto-conical outer portion 5, the outer surface of which constitutes a wedge surface converging in the direction of the arrow 11.

At least one and preferably a plurality of second wedge or abutment members 7 are mounted between shoulders 9 of the tubular member 3. The inner surface of each of the members 7 constitutes a portion of an inner substantially frusto-conical wedge surface adapted to cooperate with the outer wedge surface of the member 4, as is clearly shown in the drawing. The arrangement of the parts is such that the parts 4 and 7, in the position shown in Fig. 1, are out of wedging engagement with each other.

An outer third tubular wedge member 10, which may be stationary, encompasses the above-described structural elements. The inner surface of the tubular member 10 constitutes a substantially cylindrical wedge surface and the outer surfaces of the members 7 each constitute a portion of an outer substantially cylindrical wedge surface adapted to cooperate with the inner wedge surface of the tubular member 10. These surfaces, too, are out of wedging engagement with each other as shown in Fig. 1.

When a platform or other load is to be raised the spindle 1 is rotated in such a manner as to move the nut 2 and the member 3 in the direction of the arrow 11. In the event of rupture of the nut 2, the weight of the load will tend to move the member 3 in a direction opposite to the direction indicated by the arrow 11, i. e., rightwardly as viewed in Fig. 1. The member 3 will thereupon move the members 7 rightwardly and these members will, as may readily be seen from the drawing, be wedged between the member 4 and the tubular member 10, thereby preventing rightward movement of the member 3 independently of the spindle 1.

It will be clear from the above that the spindle 4 is normally out of force or power transmitting engagement with the members 7, and consequently out of force of power transmitting engagement with the member 3. It is only in the event of rupture of the nut 2 that the member 4 will be called upon to enter into force transmitting engagement with the members 7 and consequently prevent rightward movement of the member 3 under the influence of the weight of the load with which the member 3 is associated. However, by virtue of the fact that the member 4 is moved axially by the spindle 1 at the same rate at which the nut 2 is moved, the above-described parts will always be in their proper relative positions, so that the nut 4 will at all times be in such a position relative to the members 7 that the latter may wedgingly engage the nut 4 in the event of damage to the nut 2. It follows that the member 4 is subjected to no forces during normal operation of the device inasmuch as the entire force or power transmission between the spindle 1 and the member 3 occurs by way of the nut 2. Consequently, there is no danger of there occurring any rupture or other damage to the member 4.

In practice, the member 4 is subjected only to the extremely slight wear resulting from the threaded engagement between this member and the spindle 1 during rotation of the latter.

It is possible, according to the present invention, to lower the platform or other load with which the driving arrangement is associated, even after rupture of the nut 2 and engagement of the parts 4, 7, 10. This may be accomplished by rotating the spindle 1 in such a manner that the member 4 is moved rightwardly, as viewed in Fig. 1. Such rightward movement of the member 4 will permit rightward movement of the wedge members 7 under the influence of the rightward force exerted on the member 3 by the weight of the load.

It will therefore be seen that the above-described braking mechanism will at all times present rightward axial movement of the driven member 3 independently of the spindle 1 at a rate greater than the rate at which the spindle drives the assembly 2, 3.

It will be understood that each of the elements described above, or two or more together, may also find a useful application in other types of driving arrangements differing from the types described above.

While the invention has been illustrated and described as embodied in a driving arrangement which is particularly adapted to be used in conjunction with or as a jack for lifting platforms or other loads, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A drive arrangement, comprising, in combination, a driven member; a drive member for driving said driven member in opposite directions; connecting means connected to said drive member and said driven member for transmitting the driving force from the former to the latter in both of said directions; and abutment means for preventing movement of said driven member in at least one of said directions independently of said drive member, said abutment means including a first abutment member independent of said connecting means and driven by said driven member in said opposite directions at the same rate at which said driven member is driven by said drive member, and a second abutment member on said driven member and being normally out of force transmitting engagement with said first abutment member, said second abutment member being adapted to abut against said first abutment member when said driven member tends to move in said one direction at a rate greater than the rate at which said drive member drives said driven member and said first abutment member, whereby in the event of such malfunction of said connecting means as will permit independent movement of said driven member in said one direction relative to said drive member at a rate greater than the rate at which the same drives said driven member, said abutment members will abuttingly engage each other, thereby preventing movement in said one direction of said driven member relative to said drive member at said greater rate.

2. A drive arrangement comprising, in combination, a driven member; a drive member for driving said driven member in opposite directions; connecting means connected to said drive member and said driven member for transmitting the driving force from the former to the latter in both of said directions; and wedge means for preventing movement of said driven member in at least one of said directions independently of said drive member, said wedge means including a first wedge member independent of said connecting means and driven by said drive member in said opposite directions at the same rate at which said driven member is driven by said drive member, and a second wedge member on said driven member and being normally out of wedging engagement with said first wedge member, said second wedge member being adapted to engage said first wedge member when said driven member tends to move in said one direction at a rate greater than the rate at which said drive member drives said driven member and said first wedge member, whereby in the event of such malfunction of said connecting means as will permit independent movement of said driven member in said one direction relative to said drive member at a rate greater than the rate at which the same drives said driven member, said wedge members will wedgingly engage each other, thereby preventing movement in said one direction of said driven member relative to said drive member at said greater rate.

3. A drive arrangement comprising, in combination, a driven member; a drive member for driving said driven member in opposite directions; connecting means connected to said drive member and said driven member for transmitting the driving force from the former to the latter in both of said directions; and wedge means for preventing movement of said driven member in at least one of said directions independently of said drive member, said wedge means including a first movable wedge member independent of said connecting means and driven by said drive member in said opposite directions at the same rate at which said driven member is driven by said drive member, a second movable wedge member on said driven member and being normally out of wedging engagement with said first movable wedge member, and a stationary wedge member arranged in the path along which said drive member drives said driven member and being adapted to be engaged by said second movable wedge member, said second movable wedge member being adapted to be wedged between said first movable wedge member and said stationary wedge member when said driven member tends to move in said one direction at a rate greater than the rate at which said drive member drives said driven member and said first movable wedge member, whereby in the event of such malfunction of said connecting means as will permit independent movement of said driven member in said one direction relative to said drive member at a rate greater than the rate at which the same drives said driven member, said second movable wedge member will be wedged between said first movable wedge member and said stationary wedge member, thereby preventing movement in said one direction of said driven member relative to said drive member at said greater rate.

4. A drive arrangement comprising, in combination, a spindle drive member having an external thread portion; a tubular driven member encompassing said drive member and having an internal thread portion in threaded engagement with said external thread portion of said drive member so that the same may drive said driven member in opposite axial directions; and wedge means for preventing axial movement of said driven member in at least one of said directions at a rate greater than the rate at which said drive member drives said driven member, said wedge means including a first wedge member independent of said internal thread portion of said driven member and in threaded engagement with said external thread portion of said drive member so that the same may drive said first wedge member in opposite axial directions at the same rate at which said drive member drives said driven member, and a second wedge member on said driven member and being normally out of wedging engagement with said first wedge member, said second wedge member being adapted to engage said first wedge member when said driven member tends to move in said one direction at said greater rate, whereby in the event of such rupture of said internal thread portion of said driven member as will permit independent axial movement thereof in said one direction relative to said drive member at said greater rate, said wedge members will wedgingly engage each other, thereby preventing axial movement in said one direction of said driven member relative to said driven member at said greater rate.

5. A drive arrangement comprising, in combination, a spindle drive member having an external thread portion; a tubular driven member encompassing said drive member and having an internal thread portion in threaded engagement with said external thread portion of said drive member so that the same may drive said driven member in opposite axial directions; and wedge means for preventing axial movement of said driven member in at least one of said directions at a rate greater than the rate at which said drive member drives said driven member, said wedge means including a first wedge member independent of said internal thread portion of said driven member, in threaded engagement with said external thread portion of said drive member so that the same may drive said first wedge member in opposite axial directions at the same rate at which said drive member drives said driven member, and having a substantially frusto-conical outer wedge surface diverging in said one direction, and a second wedge member on said driven member and having an inner wedge surface constituting at least a portion of a substantially frusto-conical inner wedge surface diverging in said one direction, said wedge surfaces being normally out of wedging engagement with each other but adapted wedgingly to engage each other when said driven member tends to move in said one direction at said greater rate, whereby in the event of such rupture of said internal thread portion of said driven member as will permit independent axial movement thereof in said one direction relative to said drive member at said greater rate, said wedge surfaces of said wedge members will wedgingly engage each other, thereby preventing axial movement in said one direction of said driven member relative to said drive member at said greater rate.

6. A drive arrangement comprising, in combination, a spindle drive member having an external thread portion; a tubular driven member encompassing said drive member and having an internal thread portion in threaded engagement with said external thread portion of said drive member so that the same may drive said driven member in opposite axial directions; and wedge means for preventing axial movement of said driven member in at least one of said directions at a rate greater than the rate at which said drive member drives said driven member, said wedge means including a first wedge member independent of said internal thread portion of said driven member and in threaded engagement with said external thread portion of said drive member so that the same may drive said first wedge member in opposite axial directions at the same rate at which said drive member drives said driven member and having a substantially frusto-conical outer wedge surface diverging in said one direction, and a plurality of second wedge members on said driven member, each of said second wedge members having an inner wedge surface constituting a portion of a substantially frusto-conical inner wedge surface diverging in said one direction, said inner and outer wedge surfaces being normally out of wedging engagement with each other but adapted wedgingly to engage each other when said driven member tends to move in said one direction at said greater rate, whereby in the event of such rupture of said internal thread portion of said driven member as will permit independent axial movement thereof in said one direction relative to said drive member at said greater rate, said inner and outer wedge surfaces of said wedge members will wedgingly engage each other, thereby preventing axial movement in said one direction of said driven member relative to said drive member at said greater rate.

7. A drive arrangement comprising, in combination, a spindle drive member having an external thread portion; a tubular driven member encompassing said drive member and having an internal thread portion in threaded engagement with said external thread portion of said drive member so that when the same rotates about its axis it may drive said driven member in opposite axial directions while rotation thereof about its axis is prevented; and wedge means for preventing axial movement of said driven member in at least one of said directions at a rate greater than the rate at which said drive member drives said driven member, said wedge means including a first wedge member independent of said internal thread portion of said driven member and in threaded engagement with said external thread portion of said drive member so that the same may drive said first wedge member in opposite directions at the same rate at which said drive member drives said driven member while rotation of said first wedge member is prevented, and a second wedge member on said driven member and being normally out of wedging engagement with said first wedge member, said second wedge member being adapted to engage said first wedge member when said driven member tends to move in said one direction at said greater rate, whereby in the event of such rupture of said internal thread portion of said driven member as will permit independent axial movement thereof in said one direction relative to said drive member at said greater rate, said wedge members will wedgingly engage each other, thereby preventing axial movement in said one direction of said driven member relative to said drive member at said greater rate.

8. A drive arrangement as defined in claim 7, and key means interconnecting said driven member and said first wedge member for preventing rotation of the latter while permitting independent axial movement between the same.

9. A drive arrangement comprising, in combination, a spindle drive member having an external thread portion; a tubular driven member encompassing said drive member and having an internal thread portion in threaded engagement with said external thread portion of said drive member so that the same may drive said driven member in opposite axial directions; and wedge means for preventing axial movement of said driven member in at least one of said directions at a rate greater than the rate at which said drive member drives said driven member, said wedge means including a first movable wedge member independent of said internal thread portion of said driven member and in threaded engagement with said external thread portion of said drive member so that the same may drive said first movable wedge member in opposite axial directions at the same rate at which said drive member drives said driven member, a second movable wedge member on said driven member and being normally out of wedging engagement with said first movable wedge member, and a stationary tubular wedge member encompassing said drive and driven members and extending axially throughout the length along which said drive member drives said driven member, said stationary wedge member being adapted to be engaged by said second movable wedge member, said second movable wedge member being adapted to be wedged between said first movable wedge member and said stationary wedge member when said driven member tends to move in said one direction at said greater rate, whereby in the event of such rupture of said internal thread portion of said driven member as will permit independent axial movement thereof in said one direction relative to said drive member at said greater rate, said second movable wedge member will be wedged between said first movable wedge member and said stationary wedge member, thereby preventing axial movement in said one direction of said driven member relative to said drive member at said greater rate.

10. A drive arrangement comprising, in combination, a spindle drive member having an external thread portion; a tubular driven member encompassing said drive member and having an internal thread portion in threaded engagement with said external thread portion of said drive member so that the same may drive said driven member in opposite axial directions; and wedge means for preventing axial movement of said driven member in at least one of said directions at a rate greater than the rate at which said drive member drives said driven member, said wedge means including a first wedge member independent of said internal thread portion of said driven member and in threaded engagement with said external thread portion of said drive member so that the same may drive said first wedge member in opposite axial directions at the same rate at which said drive member drives said driven member, a second wedge member on said driven member and being normally out of wedging engagement with said first wedge member, and a third tubular wedge member encompassing said drive and driven members and extending axially throughout the length along which said drive member drives said driven member, said third wedge member being adapted to be engaged by said second movable wedge member, said second wedge member being adapted to be wedged between said first wedge member and said third wedge member when said driven member tends to move in said one direction at said greater rate, whereby in the event of such rupture of said internal thread portion of said driven member as will permit independent axial movement thereof in said one direction relative to said drive member at said greater rate, said second movable wedge member will be wedged between said first and third wedge members, thereby preventing axial movement in said one direction of said driven member relative to said drive member at said greater rate.

11. A drive arrangement comprising, in combination, a spindle drive member having an external thread portion; a tubular driven member encompassing said drive member and having an internal thread portion in threaded engagement with said external thread portion of said drive member so that the same may drive said driven member in opposite axial directions; and wedge means for preventing axial movement of said driven member in at least one of said directions at a rate greater than the rate at which said drive member drives said driven member, said wedge means including a first movable wedge member independent of said internal thread portion of said driven member, in threaded engagement with said external thread portion of said drive member so that the same may drive said first movable wedge member in opposite axial directions at the same rate at which said drive member drives said driven member, and having a substantially frusto-conical outer wedge surface diverging in said one direction, a stationary tubular wedge member encompassing said drive driven members, extending axially throughout the length along which said drive member drives said driven member, and having a substantially cylindrical inner wedge surface, and a second movable wedge member on said driven member and having an inner wedge surface constituting at least a portion of a substantially frusto-conical inner wedge surface diverging in said one direction and adapted to cooperate with said outer wedge surface of said first movable wedge member, said second movable wedge member also having an outer wedge surface constituting at least a portion of a substantially cylindrical outer wedge surface adapted to cooperate with said inner wedge surface of said stationary wedge member, said cooperating wedge surfaces being normally out of wedging engagement with each other but adapted wedgingly to engage each other when said driven member tends to move in said one direction at said greater rate, whereby in the event of such rupture of said internal thread portion of said driven member as will permit independent axial movement thereof in said one direction relative to said drive member at said greater rate, said second movable wedge member will be wedged between said first movable wedge member and said stationary wedge member, thereby preventing axial movement in said one direction of said driven member relative to said drive member at said greater rate.

12. A drive arrangement comprising, in combination, a spindle drive member having an external thread portion; a tubular driven member encompassing said drive member and having an internal thread portion in threaded engagement with said external thread portion of said drive member so that the same may drive said driven member in opposite axial directions; and wedge means for preventing axial movement of said driven member in a least one of said directions at a rate greater than the rate at which said drive member drives said driven member, said wedge means including a first movable wedge member independent of said internal thread portion of said driven member, in threaded engagement with said external thread portion of said drive member so that the same may drive said first movable wedge member in opposite axial directions at the same rate at which said drive member drives said driven member, and having a substantially frusto-conical outer wedge surface diverging said one direction, a stationary tubular wedge member encompassing said drive driven members, extending axially throughout the length along which said drive member drives said driven member, and having a substantially cylindrical inner wedge surface, and a plurality of second movable wedge members on said driven member, each having an inner wedge surface constituting a portion of a substantially frusto-conical inner wedge surface diverging in said one direction and adapted to cooperate with said outer wedge surface of said first movable wedge member, each of said second movable wedge members also having an outer wedge surface constituting a portion of a substantially cylindrical outer wedge surface adapted to cooperate with said inner wedge surface of said stationary wedge member, said cooperating wedge surfaces being normally out of wedging engagement with each other but adapted wedgingly to engage each other when said driven member tends to move in said one direction at said greater rate, whereby in the event of such rupture of said internal thread portion of said driven member as will permit independent axial movement thereof in said one direction relative to said drive member at said greater rate, said second movable wedge members will be wedged between said first movable wedge member and said stationary wedge member, thereby preventing axial movement in said one direction of said driven member relative to said drive member at said greater rate.

No references cited.